UNITED STATES PATENT OFFICE.

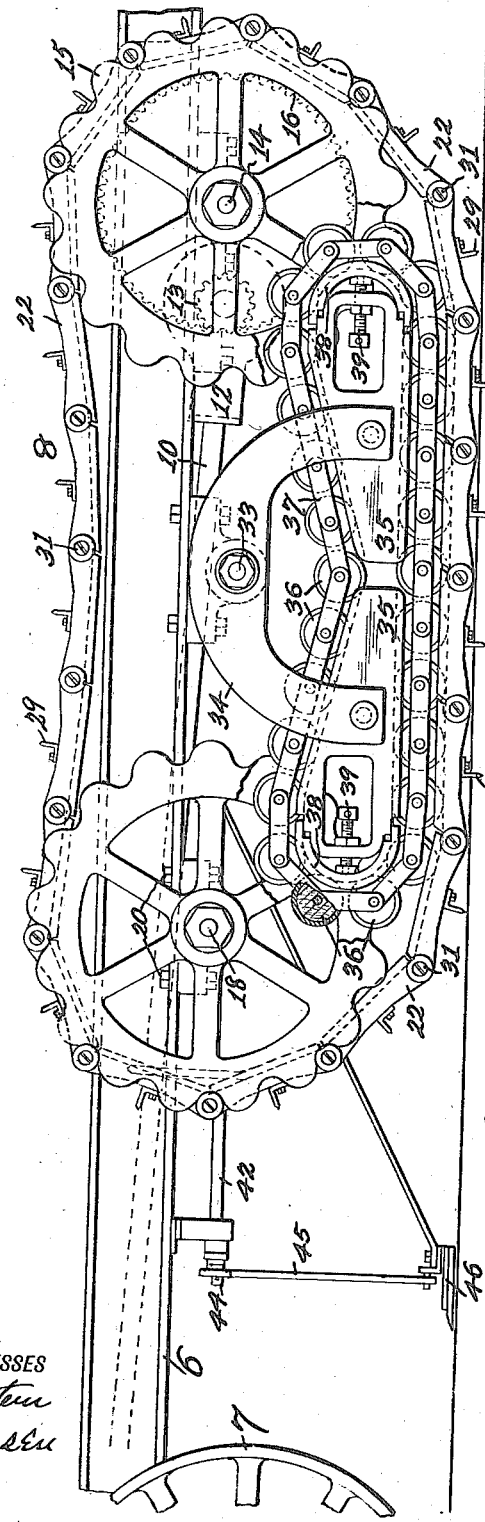

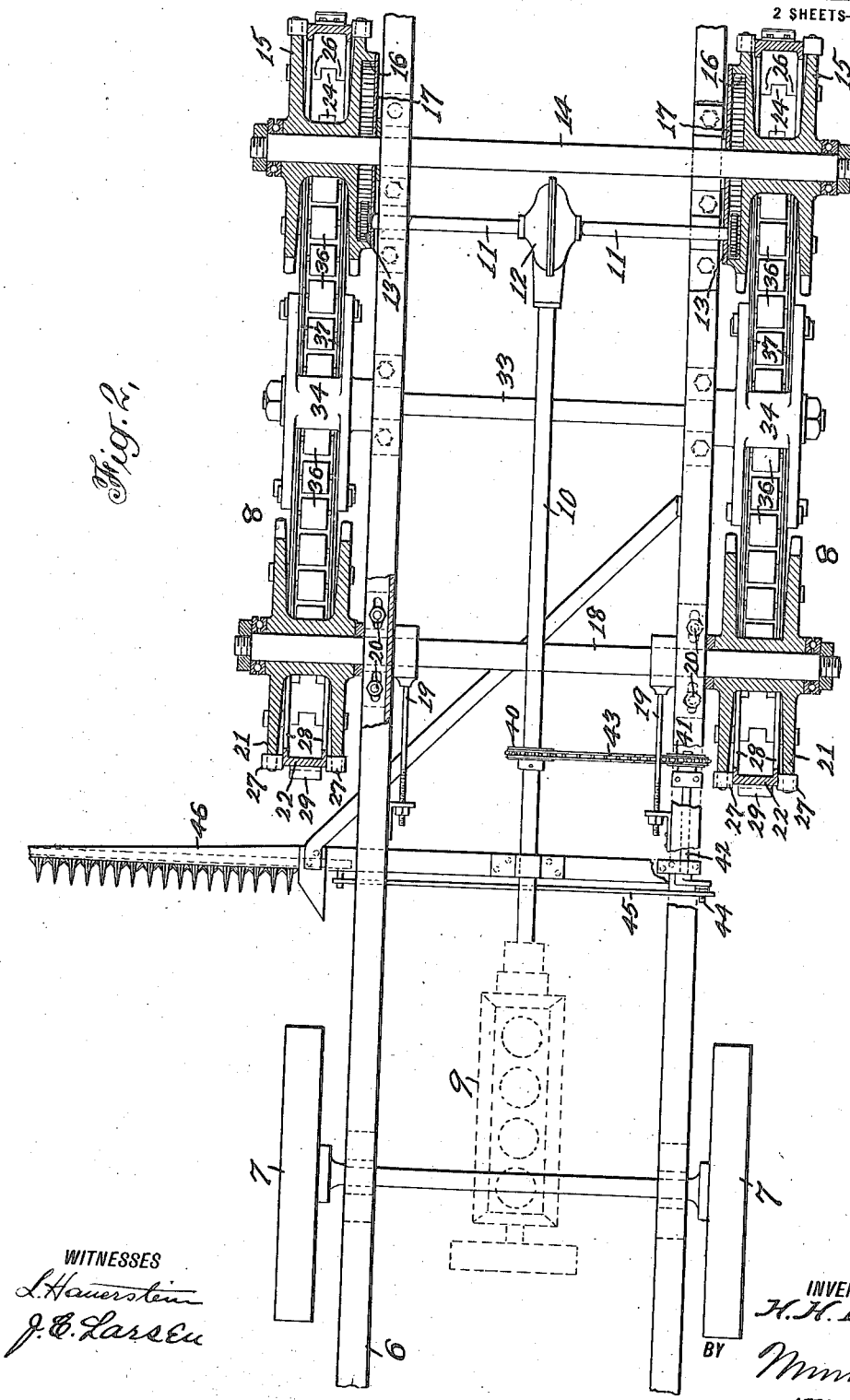

HOLMAN HARRY LINN, OF MORRIS, NEW YORK.

TRACTOR.

1,270,531.  Specification of Letters Patent.  Patented June 25, 1918.

Application filed December 1, 1916. Serial No. 134,294.

*To all whom it may concern:*

Be it known that I, HOLMAN H. LINN, a citizen of the United States, and a resident of Morris, in the county of Otsego and State of New York, have invented certain new and useful Improvements in Tractors, of which the following is a specification.

My invention relates to tractors of the caterpillar type, and one of the main objects thereof is to provide interlocking sections joined by means of pins which are properly lubricated and absolutely dust proof.

Another object is to provide such sections with detachable creepers which can be readily replaced when worn or damaged.

Another object is to provide such sections with a maximum load bearing surface.

Another object is to provide means on such sections whereby power is applied equally at each side thereof and thus insure true operation thereof.

Another object is to provide sprocket wheels of a double construction specially adapted to such sections.

Another object is to provide self-lubricating, anti-friction, rolls for taking the load without any of the load being transmitted to the spindles thereof.

Another object is to provide a flexible carrier for the anti-friction rolls which permits of automatic adjustment to accommodate the caterpillar to all road conditions, whereby maximum traction is assured.

And further objects are to provide such caterpillar tractor sections which are simple in construction, installation, substitution, and repair, which are practically free from repair requirements, and which are comparatively inexpensive.

My invention is fully described in the following specification, of which the accompanying drawings form a part, in which like characters refer to like parts in each of the views, and in which:—

Figure 1 is a fragmentary side elevation of a vehicle provided with my tractor, shown as with a mowing attachment;

Fig. 2 is a top plan view thereof, partly in section;

Fig. 3 is a plan view of one of my tractor sections joined to another shown fragmentarily;

Fig. 4 is a section taken on the line 4—4 of Fig. 3; and

Fig. 5 is a section taken on the line 5—5 of Fig. 3.

Referring to the drawings, 6 represents the frame of a vehicle having wheels 7 at one end and caterpillar tractors 8 at the opposite end, a motor 9 being indicated the drive shaft 10 of which transmits power to jack-shafts 11 through a differential arranged within a housing 12, said jack-shafts being journaled on the frame 6 in any desired manner and being provided with spur pinions 13 at their outer ends.

An axle 14 rigidly held on the frame 6 is journaled at its ends for double-flanged sprocket wheels 15 provided, each, with an internal spur gear 16 enmeshed with the respective pinion 13, Fig. 2, whereby both sprockets 15 will be motor driven though under the control of the differential, shields 17 being provided on the axle 14 and jackshafts 11 to make said gearing dust and waterproof.

An axle 18 is slidably held on the frame 6 in an adjustable manner, as by threaded rods 19, Fig. 2, and locked in adjusted position as by bolts and nuts 20 or in any other desired manner, and said axle 18 carries sprocket wheels 21 at its ends similar in structure to the sprockets 15 though not provided with the internal gears 16, the sprockets on each side of the vehicle being in operative engagement with the respective tractor 8.

Each tractor 8 consists of a plurality of similar sections 22 each of which comprises a plate 23 having a central knuckle 24 at one end having a pintle 25 press fitted thereinto, two separated knuckles 26 at the opposite end and between which the knuckle 24 of the adjacent section snugly fits, two bosses 27 laterally extended from the respective knuckles 26, inner spaced longitudinal flanges 28, and detachable creepers 29 held by bolts 30 or in any other suitable manner.

The pintles 25 are freely rotatable in the respective knuckles 26 and extend partially into the respective bosses 27 which are bored for their entire length and internally threaded at the outer ends of said bores to adjustably hold externally threaded cups 31, Fig. 5, forcing grease 32 against the ends of the pintles whereby the proper lubrication of the journaled portions of said pintles within the respective knuckles 26 is positively assured, said cups being flush with the ends of the bosses whereby no injury thereto may occur, and the outer ends thereof may be slotted whereby they may be rotated as by a screw driver or similar tool.

Carried by the frame 6, intermediate the axles 14 and 18, is a shaft 33 the ends of which carry forked rock plates 34 pivoted thereto, and each of which carries at its ends track blocks 35 pivoted thereto for anti-friction rollers 36 held in spaced relationship by endless chains 37, arcuate track members 38 being provided at the outer ends of said track blocks and adjustable with respect thereto by means of threaded rods 39 or the equivalent whereby, said endless chains may be held under desired tension, and said rollers are adapted to roll over the inner machined surfaces of the tractor sections 22 between the flanges 28, Fig. 4, thereby providing a practically indestructible bearing along the full length of each section but, because of the manner of mounting the rollers with respect to the frame 6, each tractor 8 may have its sections on the ground articulate so as to insure maximum traction regardless of the inequalities of the surface over which the vehicle is moving.

While I make no claim to any particular utilization of the vehicle, I have shown its adaptation as a mover, a sprocket 40 on the drive shaft 10 being connected with a sprocket 41 on a countershaft 42 by means of an endless chain 43, said countershaft being journaled in suitable bearings on the frame 6 and being provided with a crank 44 at its forward end in operative engagement with a pitman rod 45 in turn connected with a cutter bar 46 suitably guided with respect to the frame 6, suitable control means for the cutter bar being provided although not shown.

In view of the double flanged sprocket wheels 15 and 21 engaging the bosses 27 of the tractor sections at both sides of said sections, the latter are guided in a true manner resulting in comparative freedom from wear and minimizing the possibility of accident to said sections.

Also, in view of the substantially continuous bearing surface presented to the rollers 36, a maximum load capacity results in a substantially frictionless manner and, because of the rocking construction of the roller carrier and the ability of the tractor sections to articulate with respect to each other, maximum traction results on ground of any surface irregularities.

The rollers 36 are preferably formed of tubing having a wall of desired thickness and within which is a special wood center, oil treated, thereby making light, strong, self-lubricating, anti-frictional, rollers held in proper alinement by means of the guiding chains.

Having fully described my invention, what I claim as new, and desire to secure by Letters Patent, is:—

1. In a vehicle, the combination with a frame, of a plurality of axles carried thereby, wheels carried by the axles, endless traction belts carried by the wheels, rock-plates pivoted with the frame and arranged within the endless traction belts, separate track-blocks pivotally connected with each rock-plate, and anti-friction elements disposed between the track-blocks and the corresponding endless traction belt.

2. In a vehicle, the combination with a frame, of a plurality of wheels rotatively connected therewith, endless traction belts carried by the wheels, forked rock-plates pivotally mounted in the frame and arranged near the lower portions of the endless traction belts, separate track-blocks pivoted between their ends to the ends of each rock-plate, rollers arranged between the track-blocks and the corresponding endless traction belt, and means to retain the rollers suitably spaced.

3. In a vehicle, the combination with a frame; of a plurality of wheels rotatively connected therewith; endless traction belts carried by the wheels, each of which comprises a plurality of pivoted sections, each section having interior spaced longitudinal flanges; rock-plates pivoted with the frame and arranged near the lower portions of the endless traction belts; separate track blocks pivoted with each rock-plate and arranged inwardly of and near the lower portion of the corresponding endless traction belt; rollers disposed between the track-blocks and the lower portion of the corresponding endless traction belt and adapted to pass between the longitudinal flanges of the sections thereof to be guided by the flanges, said rollers also surrounding said track-blocks; and an endless chain having pivotal connection with the rollers for retaining the same in suitable spaced relation.

4. In a vehicle, the combination with a frame; of a plurality of wheels rotatively connected therewith; endless traction belts carried by the wheels, each of which comprises a plurality of pivoted sections, each section having interior spaced longitudinal flanges; forked rock-plates pivoted with the frame and arranged within the endless traction belts; separate track-blocks pivoted with the ends of each forked rock-plate; adjustable track-members carried by the outer ends of the track-blocks; means to move the track members toward and away from the track-blocks; a set of rollers surrounding the track-blocks and track-members and adapted to pass between the longitudinal flanges of said sections; and an endless belt pivotally connecting the rollers in said set for retaining them suitably spaced.

HOLMAN HARRY LINN.